(12) United States Patent
Hayashi et al.

(10) Patent No.: US 6,519,222 B2
(45) Date of Patent: *Feb. 11, 2003

(54) AUTOMATIC DISC CHANGING DEVICE

(75) Inventors: Akio Hayashi, Kanagawa (JP); Koutaro Onso, Tokyo (JP); Hitoshi Nakamura, Ibaraki (JP); Kouichi Shibasaki, Tokyo (JP)

(73) Assignee: Asaca Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/445,019
(22) PCT Filed: Apr. 2, 1999
(86) PCT No.: PCT/JP99/01740
§ 371 (c)(1), (2), (4) Date: Dec. 2, 1999
(87) PCT Pub. No.: WO99/52109
PCT Pub. Date: Oct. 14, 1999

(65) Prior Publication Data

US 2002/0075766 A1 Jun. 20, 2002

(30) Foreign Application Priority Data

Apr. 3, 1998 (JP) .......................................... 10-108714

(51) Int. Cl.[7] .............................................. G11B 17/04
(52) U.S. Cl. ....................................................... 369/178
(58) Field of Search ................................ 369/178, 191, 369/192, 34, 36, 38; 360/92, 97

(56) References Cited

U.S. PATENT DOCUMENTS

| | | | | |
|---|---|---|---|---|
| 4,274,119 A | * | 6/1981 | Hayward et al. | ............. 360/97 |
| 5,414,679 A | * | 5/1995 | Menke | ......................... 369/36 |
| 5,646,917 A | * | 7/1997 | Miyoshi et al. | ............... 369/34 |
| 5,787,058 A | | 7/1998 | Choi | ....................... 369/44.23 |
| 6,109,454 A | * | 8/2000 | Stangebye-Hansen | |

FOREIGN PATENT DOCUMENTS

| | | |
|---|---|---|
| JP | 61184764 | 8/1986 |
| JP | 64 23747 | 8/1989 |
| JP | 2-123751 | 11/1990 |

* cited by examiner

Primary Examiner—Allen Cao
(74) Attorney, Agent, or Firm—Varndell & Varndell, PLLC

(57) ABSTRACT

An automatic disc exchanging apparatus including pallets 19 each of which can support a disc D, storage cabinets 12 which stores said pallets 19, recording and reproducing drives 13 for recording and reproducing information on and from said discs D, and a transporting mechanism for transporting said pallets 19 between said storage cabinets 12 and said recording and reproducing drives, magnetic members 20a are provided in the vicinity of claw portions 19c–19f of the pallet 19. The storage cabinet 12 has an opening 12a through which the pallet 19 can move into and out of the storage cabinet, side walls 12d, 12e having grooves 12b, 12c formed therein for guiding side edges of the pallet 19, and a rear wall 12f which receives an end of the pallet 19, and magnets 20b which attract said magnetic members 20a in the pallet 19 are provided on the rear wall 12f.

3 Claims, 10 Drawing Sheets

AUTOMATIC DISC CHANGING DEVICE

TECHNICAL FIELD

The present invention relates to an apparatus for automatically exchanging pallets each having a disc-shaped information record medium installed thereon between a storage means and a recording/reproducing means.

TECHNICAL BACKGROUND

Heretofore, an automatic disc exchanging apparatus of a kind mentioned above comprises a storage means for storing a number of pallets each having a disc installed thereon, recording/reproducing means for recording or reproducing information on or from a disc held on a pallet, and a transporting means for transporting a pallet between said storage means and said recording/reproducing means. The transporting means includes a hand-over mechanism for inserting and removing a pallet into and out of the storage means and recording/reproducing means.

Figure 13:
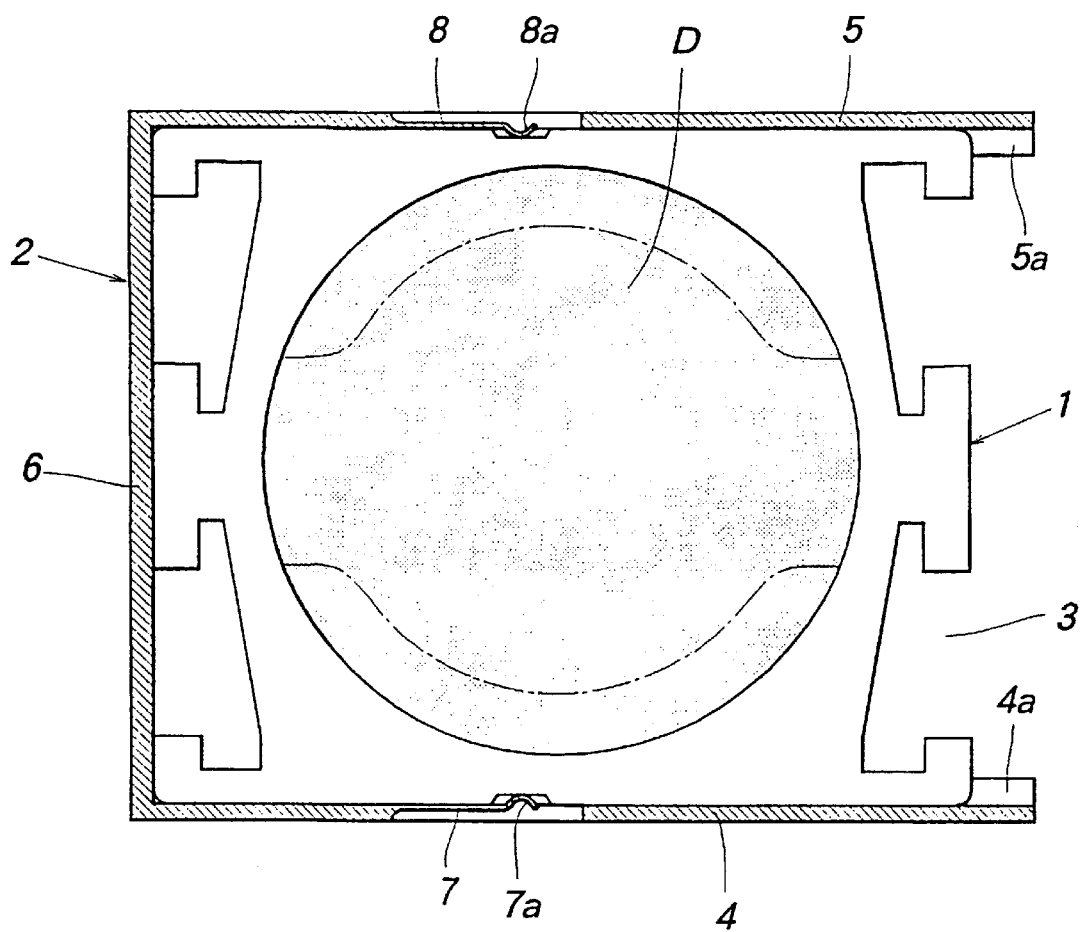
FIG. 13 is a lateral cross sectional view showing a condition in which a pallet is stored in a storage cabinet in a known apparatus.

The storage means of such an automatic disc exchanging apparatus usually comprises at least one storage cabinet 2 in which a number of pallets 1 each having a disc installed thereon are stored along a vertical column as depicted in FIG. 13. The storage cabinet 2 includes an opening 3 through which a pallet 1 can be moved into or removed from the storage cabinet, side walls 4 and 5 having recesses 4a and 5a, respectively for guiding side edges of the pallet 1, and a rear wall 6 against which a front end of the pallet 1 is abutted. On the side walls 4 and 5 of the storage cabinet 2, there are provided resilient strips 7 and 8, respectively for inhibiting a free movement of the pallet 1, and said resilient strips 7 and 8 have stopper portions 7a and 8a, respectively which are engaged with the side edges of the pallet 1.

When a pallet 1 is to be inserted into the storage cabinet 1 by means of a hand-over mechanism not shown, the pallet 1 is moved into the storage cabinet while the resilient strips 7 and 8 are pushed outward until the front end of the pallet 1 is brought into contact with the rear wall 6 of the storage cabinet 2. At this time, the resilient strips 7 and 8 are returned into the original condition and the pallet 1 is engaged by the stopper portions 7a and 8a. When the pallet 1 is removed from the storage cabinet 2, the pallet 1 pushes the resilient strips 7 and 8 outward to release the engagement of the stopper portions 7a and 8a with the pallet, and then the pallet 1 is removed out of the storage cabinet 2 which the resilient strips are pushed outward.

In the known apparatus mentioned above, when the pallet 1 is inserted into or removed from the storage cabinet 2, the pallet is moved which the resilient stoppers 7 and 8 are pushed outward. Therefore, a friction is caused between the pallet 1 and the stopper portions 7a, 8a, and the pallet 1 and stopper portions 7a, 8a might be worn to produce dusts or debris. When such dusts are adhered or deposited onto a disc, there might be raised a problem that the recording/reproducing might be affected by the dusts.

Furthermore, when the pallet 1 and stopper portions 7a, 8a are worn, the engaging force of the stopper portions 7a, 8a might be decreased, and then the pallet 1 is easily moved due to vibration or mechanical shock and might protrude from the storage cabinet 1 or hand-over mechanism. When the hand-over mechanism operates under such a condition, the hand-over mechanism might be abutted against the pallet 1 or the pallet 1 supported by the hand-over mechanism might be abutted against a part of the apparatus and the apparatus might be broken.

An object of the present invention is to provide an automatic disc exchanging apparatus which can solve the above problem and can hold pallets in given positions in a positive and reliable manner.

SUMMARY OF THE INVENTION

According to the invention, an automatic disc exchanging apparatus comprising pallets each of which can support a disc, a storage means for storing said pallets, a recording/reproducing means for recording/reproducing information on/from said discs, and a transporting means for transporting said pallets between said storage means and said recording/reproducing means, characterized in that magnetic members are provided in one of said pallets and storage means and magnets which attract said magnetic members are provided in the other of said pallets and storage means.

According to the invention, an automatic disc exchanging apparatus comprising pallets each of which can support a disc, a storage means for storing said pallets, a recording/reproducing means for recording/reproducing information on/from said discs, and a transporting means for transporting said pallets between said storage means and said recording/reproducing means, characterized in that said transporting means includes a hand-over mechanism for handing-over the pallets between said storage means and said recording/reproducing means, magnetic members are provided in one of said pallets and hand-over mechanism and magnets which attracts said magnetic members are provided in the other of said pallets and hand-over mechanism.

According to the invention, an automatic disc exchanging apparatus comprising pallets each of which can support a disc, a storage means for storing said pallets, a recording/reproducing means for recording/reproducing information on/from said discs, and a transporting means for transporting said pallets between said storage means and said recording/reproducing means, characterized in that magnetic members are provided in one of said pallets and recording/reproducing means and magnets which attracts said magnetic members are provided in the other of said pallets and recording/reproducing means.

BEST MODE OF PRACTICING THE INVENTION

Now the present invention will be explained in detail with reference to an embodiment illustrated in FIGS. 1–12.

Figure 1:
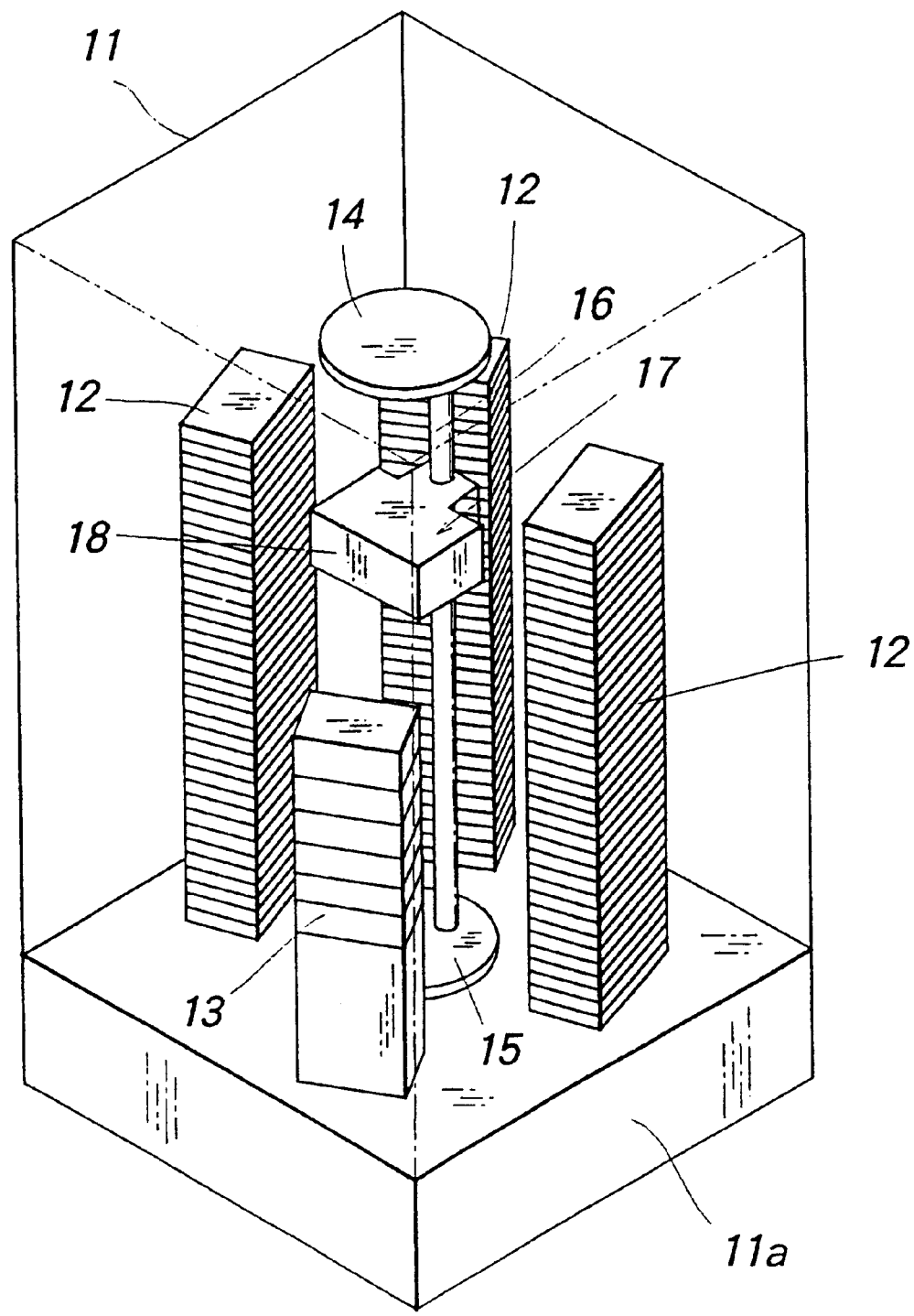
FIG. 1 is a perspective view showing an embodiment.

FIG. 1 is a perspective view showing a housing 11 a part of which is denoted by an imaginary line. On a base platform 11a provided at a bottom of the housing 11, there are arranged storage cabinets 12 in each of which a number of pallets each having a disc such as CD and DVD installed thereon are stored, and a plurality of recording and reproducing drives 13 for recording and reproducing information on and from the discs are arranged such that they are aligned along a circle having a center which is coincided with centers of upper and lower disc plates 14 and 15. To these disc plates 14 and 15, is secured a post 16 at an eccentric position, and a transporting mechanism 17 is arranged to move up and down along the post and to rotate together with the post such that a disc is transported between the storage cabinets 12 and the recording and reproducing drives 13. Three vertical columns of the storage cabinets 12 are arranged and a single vertical column of the recording and reproducing drives 13 is arranged.

The transporting mechanism 17 is consisting of a turn-over and hand-over mechanism 18 for handing-over discs with respect to the storage cabinets 12 as well as the recording and reproducing drives 13, and a driving mechanism not shown for driving the disc plates 14, 15 and turn-over and hand-over mechanism 18. The driving mechanism rotates the disc plates 14, 15 and moves the turn-over and hand-over mechanism 18 up and down along the post 16 such that the turn-over and hand-over mechanism 18 can be indexed at a desired storage cabinet as well as a desired recording and reproducing drive 13.

Figure 2:
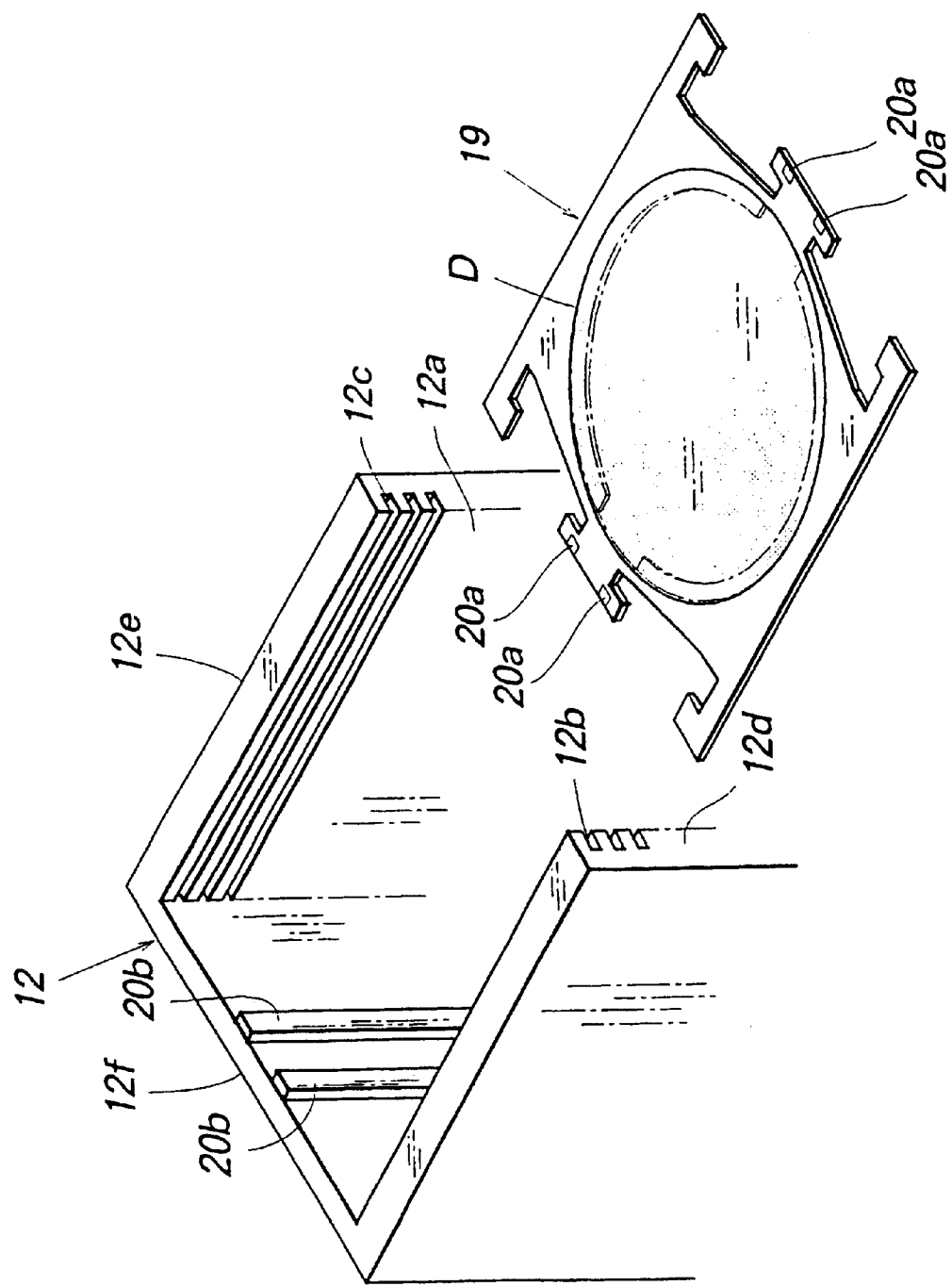
FIG. 2 is a perspective view illustrating a part of a storage cabinet together with a pallet.

As shown in the partial perspective view of FIG. 2, the storage cabinet 12 has an opening 12a through which a pallet 19 made of a synthetic resin material can be inserted and removed into and from the cabinet, side walls 12d, 12e having recesses 12b and 12c formed therein, said recesses guiding side edges of the pallet 19, and a rear wall 12f against which a front end of the pallet 19 is urged. On the rear wall 12f there are provided two magnets 20b which attract magnetic members 20a secured to the pallet 19.

Figure 3:
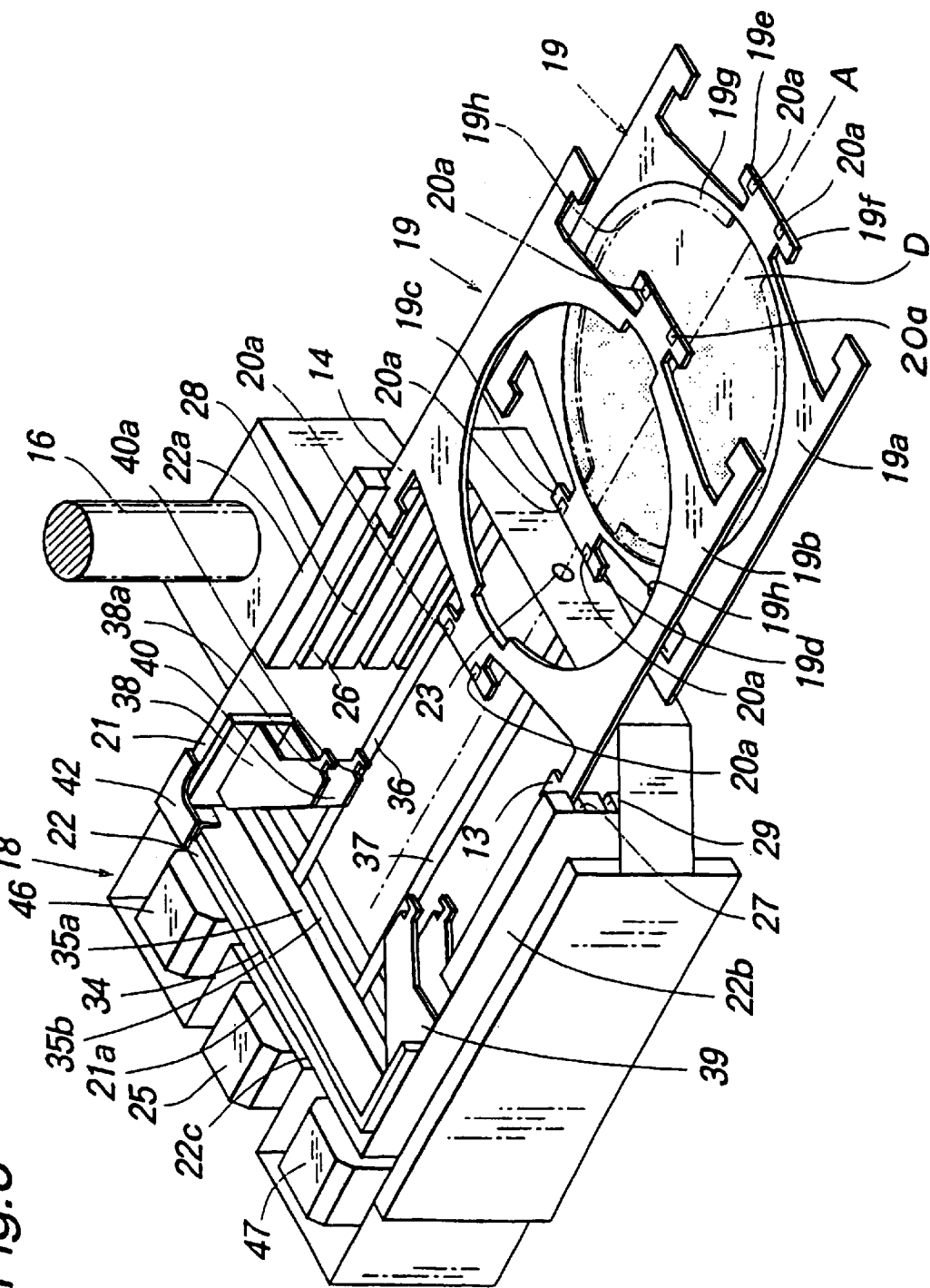
FIG. 3 is a perspective view depicting a turn-over and hand-over mechanism.

FIG. 3 is a perspective view showing the turn-over and hand-over mechanism 18 which can contain four pallets 19 in a pair-wise manner (two of which are not shown in the drawing) for transporting two discs D.

The pallet 19 has a front surface 19a on which a disc D can be placed, and a rear surface 19b opposite to the front surface. Front and rear ends of the viewed in the transporting direction are formed into the same shape, and the pallet further includes claw portions 19c–19f which are caught by arms of the turn-over and handover mechanism 18 as will be explained later. In the front surface 19a of the pallet 19 is formed a circular recessed portion 19g containing the disc D and a circular opening 19h is formed at a center of the recessed portion. The above mentioned magnetic members 20a made of an iron are secured to the pallet 19 in the vicinity of the claw portions 19c–19f. The paired pallets 19 are stacked such that their front surfaces 19a are opposed to each other, and the disc D may be contained between these pallets such that the disc D is supported on the front surface 19a of the lower pallet 19.

Figure 4:
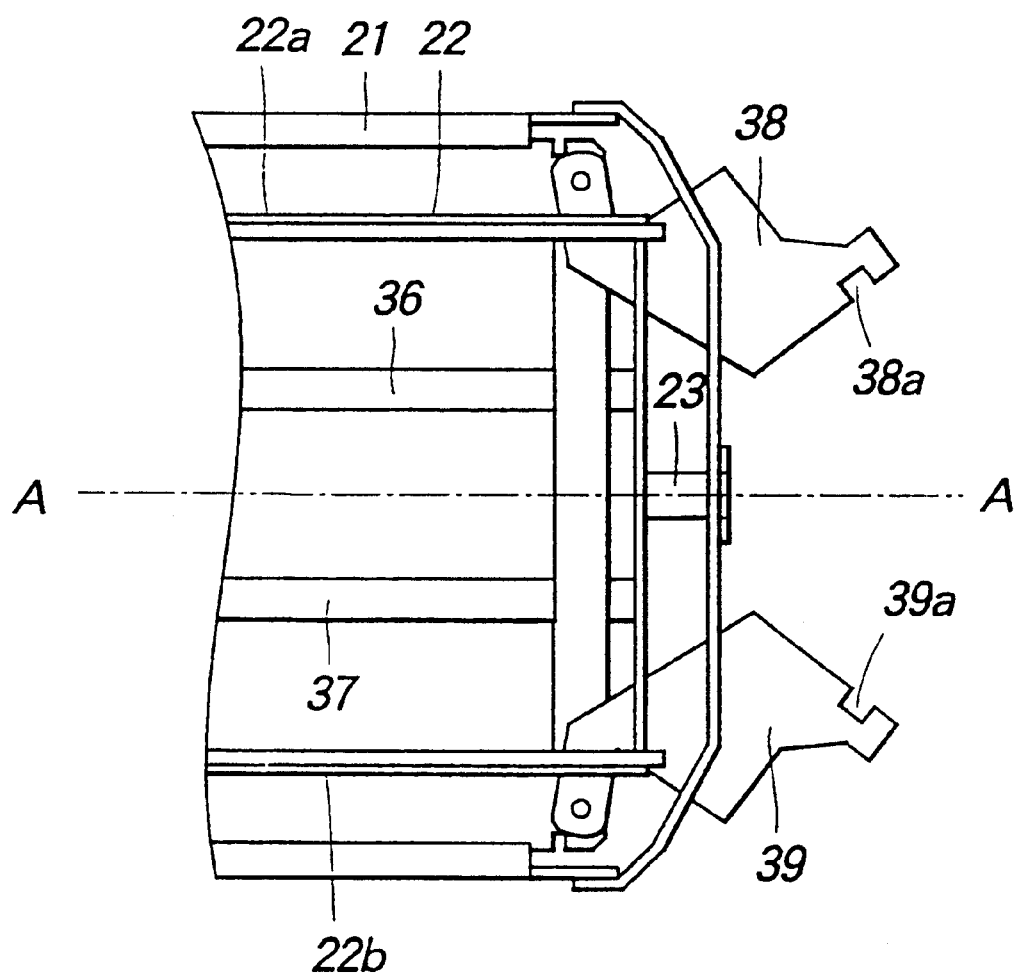
FIG. 4 is a partial enlarged view.

As shown in the enlarged lateral cross sectional view of FIG. 4, the turn-over and hand-over mechanism 18 comprises a stationary frame 21 which is supported by the post 16 movably up and down, and a rotary frame 22 arranged within the stationary frame 21 such that the rotary frame 22 can be rotated about an axis A by means of shafts 23. To an outer surface of a rear plate 21a of the stationary frame 21 is secured a motor 25 for driving the rotary frame 22, and the rotary frame 22 is rotated in both directions by 180 degrees about the axis A by means of the motor 25.

Figure 5:
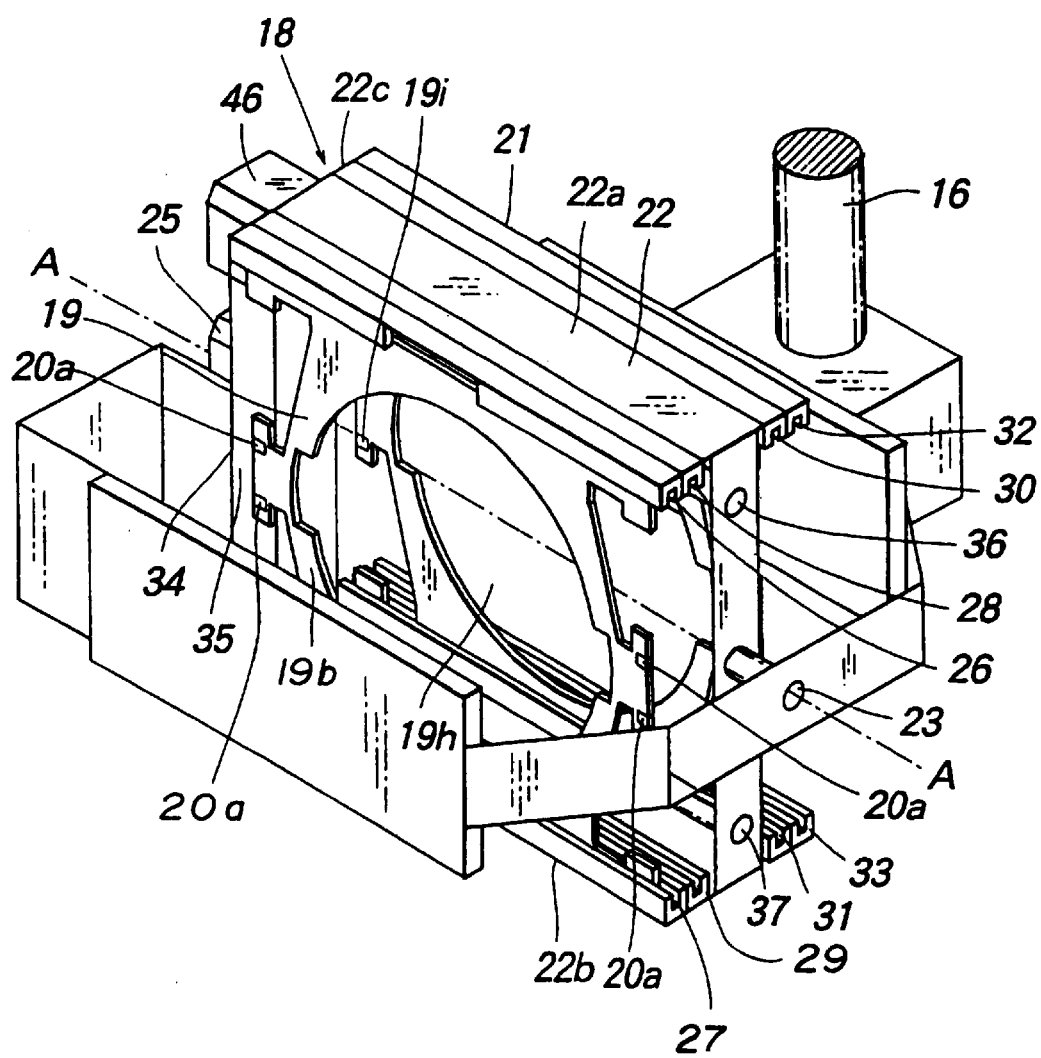
FIG. 5 is a perspective view showing the turn-over and hand-over mechanism in a condition in which a rotating frame is rotated by 90 degrees.
Figure 6:
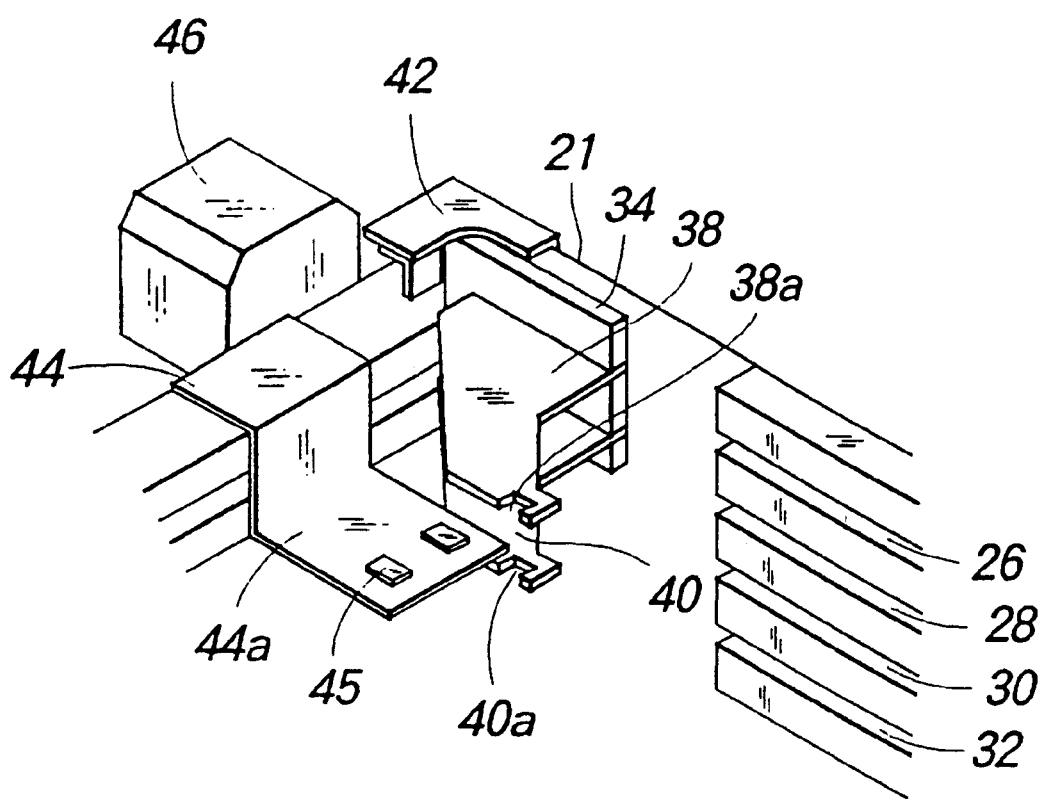
FIG. 6 is a partially enlarged perspective view of the turn-over and hand-over mechanism.

FIG. 5 is a perspective view depicting the turn-over and hand-over mechanism 18 under such a condition that the rotary frame 22 is rotated by 90 degrees, and two pallets 19 are inserted into the turn-over and hand-over mechanism 18. In each of inner surfaces of side plates 22a, 22b of the rotary frame 22, there are formed first to fourth guide grooves 26–33 for guiding the pallets 19. The first guide grooves 26, 27 and second guide grooves 28, 29 are formed in upper portions of the side plates 22a, 22b, and the third guide grooves 30, 31 and fourth guide grooves 32, 33 are formed in lower portions of the side plates 22a, 22b. In front of a rear plate 22c of the rotary frame 22, there is arranged a ]-shaped movable frame 34 which can move downward when the rotary frame 22 is rotated. To the movable frame 34 secured forward and backward movable members 35a and 35b by means of screw shafts 36 and 37, respectively such that the forward and backward movable members can move independently from each other. To the forward and backward movable members 35a and 35b are secured two pairs of arms 38, 39 and 40, 41 (arm 41 is not shown) which serve to engage the claw portions 19c–19f of the pallet 19.

The arms 38, 39 and arms 40, 41 are positioned to oppose to the second guide grooves 28, 29 and fourth guide grooves 32, 33, respectively when the rotary frame 22 is in the condition shown in FIG. 3. When the rotary frame 22 is rotated by 180 degrees to move the movable frame 34 downward, the arms 38, 39 and arms 40, 41 are moved to such positions that are opposed to the first guide grooves 26, 27 and third guide grooves 30, 31, respectively As depicted in the partial enlarged view of FIG. 6, abutting members 42, 43 (abutting member 43 is not shown) are provided at respective corners of the rear plate 21a of the stationary frame 21 such that the rotary frame 22 is brought into contact with the abutting members when the rotary frame 22 is rotated by 180 degrees. Therefore, upon rotation, the movable frame 34 is moved downward not only by the gravitational force but also by the abutting members 42, 43. A bracket 44 is secured to the movable frame 34 between the arms 38–41. On each of upper and lower surfaces of a horizontal portion 44a of the bracket 44 are secured two magnets 45 attracting the magnetic members 20a on the pallet 19.

In front portions of the arms 38–41 are formed engaging recesses 38a–41a (engaging recess 41a is not shown in the drawings) which engage the claw portions 19c, 19d of the pallet 19. On a rear surface of the rear plate 22c of the rotary frame 22 are secured motors 46, 47 for driving the arms 38–41 in the forward and backward direction by means of the screw shafts 36, 37, and a mechanism for opening and closing the arms 38–41 during the movement such that the claw portions 19c, 19d of the pallet 19 are clamped into the engaging recesses 38a–41a, said mechanism being not shown in the drawings.

Into the first guide grooves 26, 27 and third guide grooves 30, 31 of the rotary frame 22 are inserted empty pallets 19 such that their front surfaces 19a face downward. Furthermore, into the second guide grooves 28, 29 and fourth guide grooves 32, 33 are inserted pallets 19 having discs D installed therein such that their front surfaces 19a face upward. A space between the first and second guide grooves 26, 27 and 28,29 and a space between the third and fourth guide grooves 30, 31 and 32, 33 are determined such that the discs D are not removed from the pallets 19 through said spaces when the rotary frame 22 is rotated.

Figure 7:
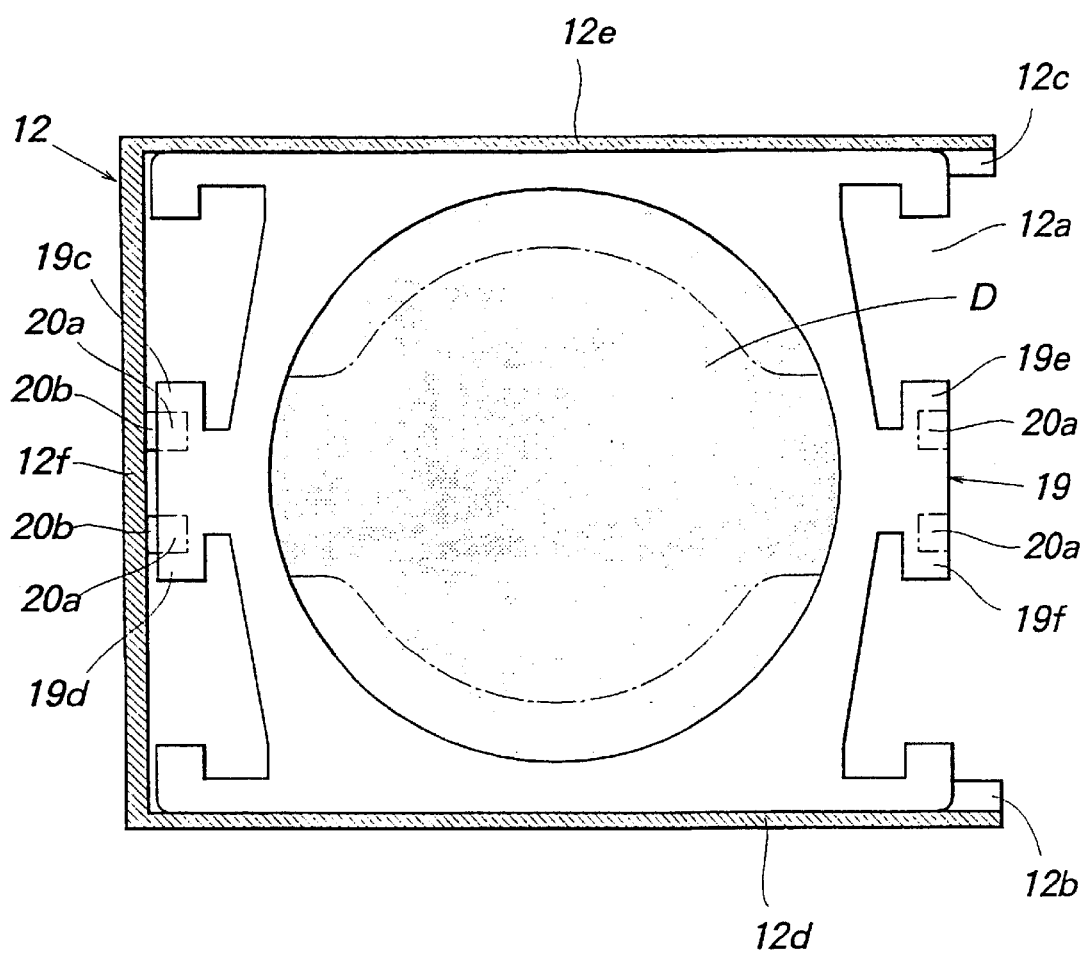
FIG. 7 is a horizontal cross sectional view illustrating a condition in which the pallet is stored in the storage cabinet.
Figure 8:
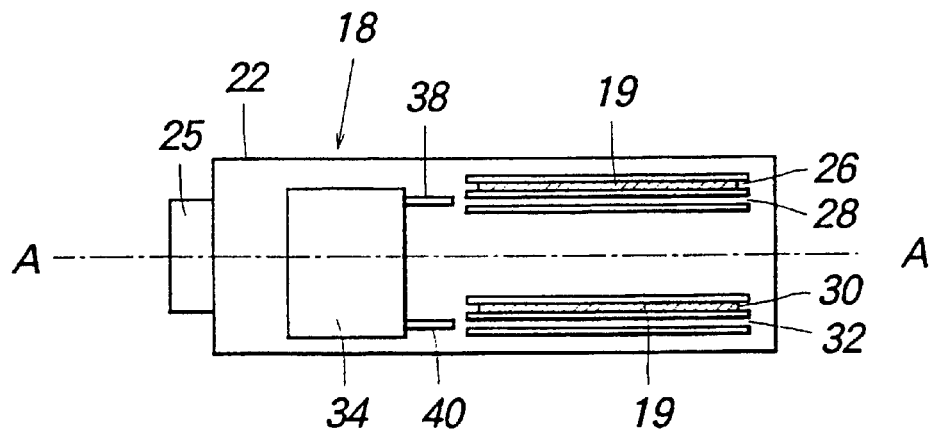
FIG. 8 is a view explaining the operation.

As illustrated in the lateral cross sectional view of FIG. 7, within the storage cabinet 12, a number of pallets each having a disc D installed thereon are stored at given correct positions such that the magnetic members 20a are attracted by the magnets 20b. As shown in the partial cross sectional view, within the turn-over and hand-over mechanism 18, empty pallets 19 are inserted into the first guide grooves 26, 27 and third guide grooves 30, 31. The arms 38, 39 and arms 40, 41 are opposed to the second guide grooves 28, 29 and fourth guide grooves 32, 33, respectively.

Figure 9:
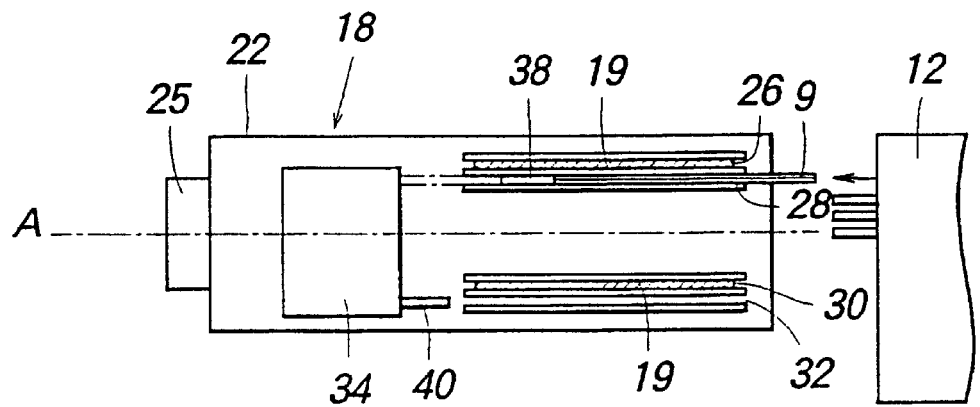
FIG. 9 is a view explaining the operation.
Figure 10:
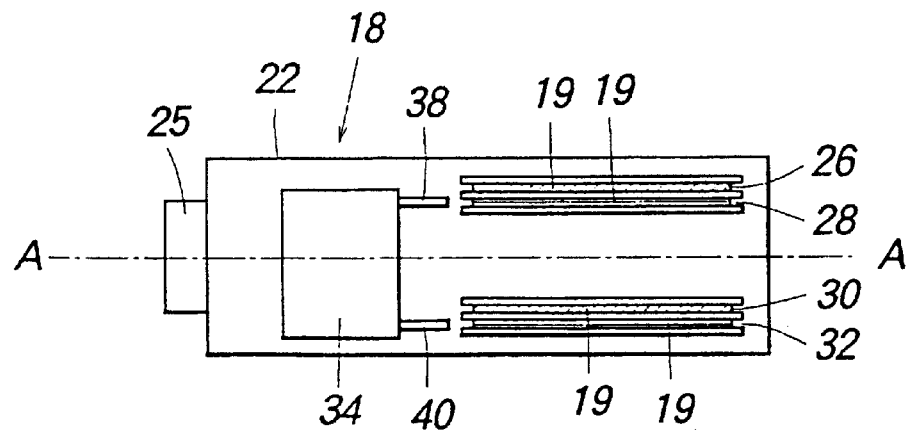
FIG. 10 is a view explaining the operation.

Next, a control circuit of the transporting mechanism 17 sends a command, and the turn-over and hand-over mechanism 18 is moved by the driving mechanism in front of a desired storage cabinet 12 as depicted in FIG. 9. Then, upper arms 38, 39 of the turn-over and hand-over mechanism 18 are moved forward to engage the pallet 19 in the storage cabinet 12, and after that the arms 38, 39 are moved backward. In this manner, the pallet 19 having a desired disc D installed thereon can be inserted into the second guide grooves 28, 29. Then, the magnetic members 20a of the pallet 19 are attracted by the magnets 45 of the turn-over and hand-over mechanism 18, and thus the pallet 19 can be correctly positioned at given position within the turn-over and hand-over mechanism 18.

Next, the turn-over and hand-over mechanism 18 is moved again by the driving mechanism in front of another desired storage cabinet 12 and the remaining arms 40, 41 are moved forward to engage a given pallet 19 in this storage cabinet 12, and the pallet 19 is inserted into the fourth guide grooves 32, 33. Also in this case, the magnetic members 20a of the pallet 19 are attracted by the magnets 45 of the turn-over and hand-over mechanism 18, and thus the pallet 19 can be correctly positioned at given position within the turn-over and hand-over mechanism 18.

Figure 11:
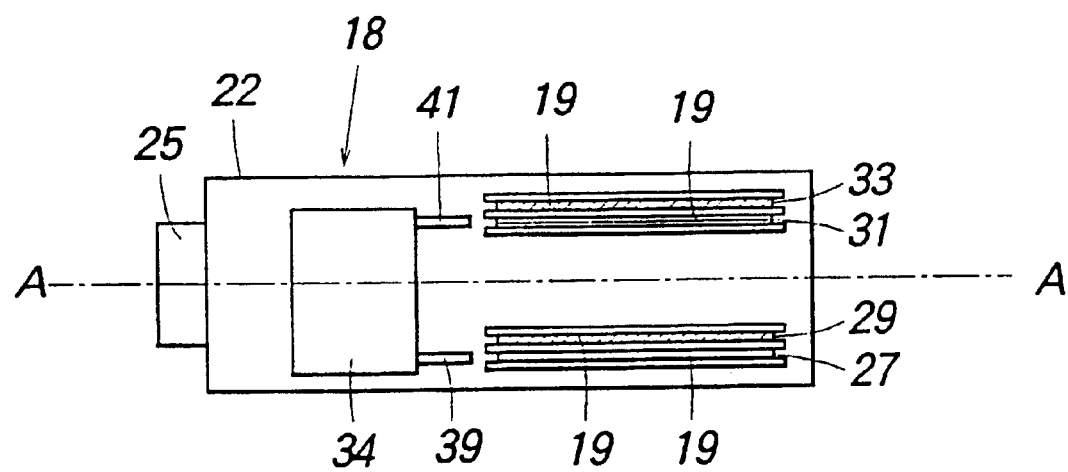
FIG. 11 is a view explaining the operation.

After the pallets 19 having the desired discs D installed thereon have been contained within the turn-over and hand-over mechanism 18, the turn-over and hand-over mechanism 18 is moved upward or downward along the post 16 by the driving mechanism, and then the upper and lower disc plates 14, 15 are rotated such that the turn-over and hand-over mechanism comes in front of a desired recording and reproducing drive 13. When it is required to turn-over the discs D, the rotary frame 22 is rotated by 180 degrees as depicted in FIG. 11. Then, since the empty pallets 19 have been inserted into the first guide grooves 26, 27 and third guide grooves 30, 31, the discs D are fall down onto these empty pallets 19 in an upside down fashion due to the rotation of the rotary frame 22.

Figure 12:
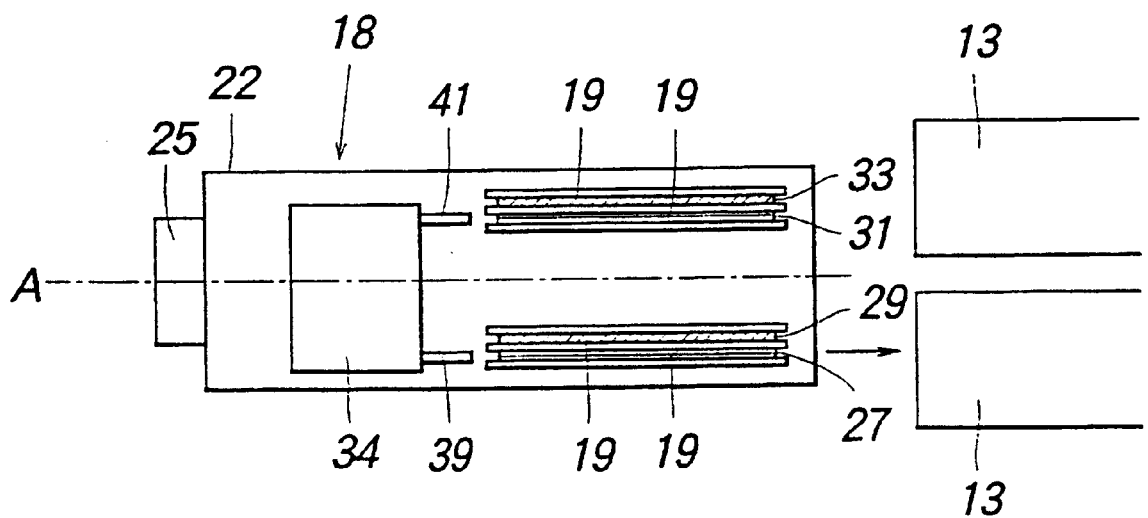
FIG. 12 is a view explaining the operation.

When the rotary frame 22 is rotated, the guide grooves 26–33 and arms 38–41 are also turned upside down, and the movable frame 34 moves downward due to the gravitational force as well as the abutment of the movable frame with the abutting members 42, 43, and the arms 38, 29 and arms 40, 41 are moved into positions which are opposed to the lower guide grooves 26, 27 and upper guide grooves 30, 31, respectively. Next, as illustrated in FIG. 12, after moving the turn-over and hand-over mechanism 18 in front of the recording and reproducing drive 13, the arms 38, 39 and arms 40, 41 are driven to push the pallets 19 having the discs D installed thereon into the recording and reproducing drive 13.

As explained above, in the present embodiment, the magnets 20b are provided in the storage cabinet 12 and the resilient strips for engaging the side edges of the pallet 19 provided in the known apparatus are removed from the storage cabinet 12, no friction occurs between the storage cabinet 12 and the pallet 19 and no dust is produced. Therefore, the deposition of dust on the disc D can be avoided to improve the reliability.

Furthermore, the magnets 20b in the storage cabinet 12 and the magnets 45 in the turn-over and hand-over mechanism 18 can place the pallet 19 at correct positions within the storage cabinet 12 as well as within the turn-over and hand-over mechanism 18 due to the attractive force, and thus the pallet 19 does not protrude from the storage cabinet 12 and hand-over mechanism 18. Therefore, it is possible to solve the problem of the known apparatus that the hand-over mechanism 18 might abut against the pallet 19 projecting from the storage cabinet 12 and the projecting pallet 19 might be brought into contact with a part of the apparatus, and the reliability can be improved.

It should be noted that in the present embodiment, the magnets 20b and 45 are provided in the storage cabinet 12 and hand-over mechanism 18 and the magnetic members 20a are provided in the pallets 19, but according to the invention the magnets may be provided in the pallets 19 and the magnetic members may be provided in the storage cabinets 12 and hand-over mechanism 18. Furthermore, the advantage can be obtained even by attracting the pallets only one of the storage cabinets 12 and hand-over mechanism 18. Moreover, the attracting force can be small, and therefore the pallets 19 can be pulled or pushed with a small force.

When the pallet 19 is inserted into the storage cabinets 12 or recording and reproducing drive 13, the pallet can be moved into a given position by utilizing the attractive force between the magnetic members 20a and the magnets 20b.

APPLICABILITY ON THE INDUSTRY.

In the automatic disc exchanging apparatus according to the invention, the magnetic members are provided in the pallets or one of the storage cabinets, hand-over mechanism and recording and reproducing derives and the magnets attracting the magnetic members are provided in one of the storage cabinets, hand-over mechanism and recording and reproducing derives or the pallets, and therefore it is no more necessary to provide the known engaging means and the production of dusts can be avoided, and further the pallets can be accurately held at given positions within the storage cabinets, hand-over mechanism and recording and reproducing drives. The reliability is improved and any accident can be effectively avoided.

What is claimed is:

1. An automatic disc exchanging apparatus comprising disk holders respectively adapted to support a disc, a storage means for storing a plurality of said disk holders, said disk holders having discs installed thereon, a recording/reproducing means for recording/reproducing information on/from said discs, and a transporting means for transporting horizontally said disk holders between said storage means and said recording/reproducing means, wherein first permanent magnets are provided at front and rear portions of said disk holders viewed in the transporting direction and second permanent magnets which attract said first permanent magnets are provided at given positions in said storage means for positioning said disk holders in said storage means.

2. An automatic disc exchanging apparatus comprising disk holders respectively adapted to support a disc, a storage means for storing a plurality of said disk holders, said disk holders having discs installed thereon, a recording/ reproducing means for recording/reproducing information on/from said discs, and a transporting means for transporting horizontally said disk holders between said storage means and said recording/reproducing means, wherein said transporting means includes a hand-over mechanism for handing-over said disk holders between said storage means and said recording/reproducing means, first permanent magnets are provided at front and rear portions of said disk holders viewed in the transporting direction, and second permanent magnets which attract said first permanent magnets are provided at given positions in said hand-over mechanism for positioning said disk holders in said storage means.

3. An automatic disc exchanging apparatus comprising disk holders each respectively adapted to support a disc, a storage means for storing a plurality of said disk holders, said disk holder having discs installed thereon, a recording/reproducing means for recording/reproducing information on/from said discs, and a transporting means for transporting horizontally said disk holders between said storage means and said recording/reproducing means, wherein magnetic members are provided at front and rear portions of said disk holders viewed in the transporting direction, and magnets which attract said magnetic members without use of electric current are provided at given positions in said recording/reproducing means for positioning said disk holders in said storage means.

* * * * *